(12) United States Patent
Edwards et al.

(10) Patent No.: US 10,902,475 B2
(45) Date of Patent: Jan. 26, 2021

(54) AUCTIONING SPONSORED MAIL BASED ON MEMBER ACTIVITY

(71) Applicant: Microsoft Technology Licensing, LLC, Redmond, WA (US)

(72) Inventors: Lindsey Laura Edwards, San Francisco, CA (US); Sean Colin Wiser, Belmont, CA (US); Guangyu Dong, Santa Clara, CA (US); Vikram Rangnekar, Saratoga, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1139 days.

(21) Appl. No.: 14/952,842

(22) Filed: Nov. 25, 2015

(65) Prior Publication Data

US 2017/0032425 A1    Feb. 2, 2017

Related U.S. Application Data

(60) Provisional application No. 62/199,198, filed on Jul. 30, 2015.

(51) Int. Cl.
*G06Q 30/00* (2012.01)
*G06Q 30/02* (2012.01)
*H04L 12/58* (2006.01)
*H04L 29/08* (2006.01)
*G06Q 50/00* (2012.01)

(52) U.S. Cl.
CPC ..... *G06Q 30/0269* (2013.01); *G06Q 30/0275* (2013.01); *G06Q 50/01* (2013.01); *H04L 51/14* (2013.01); *H04L 51/24* (2013.01); *H04L 67/306* (2013.01)

(58) Field of Classification Search
CPC ...................................................... G06Q 30/02
See application file for complete search history.

(56) References Cited

U.S. PATENT DOCUMENTS

| 2008/0155588 A1* | 6/2008 | Roberts | G06Q 30/0251 725/34 |
| 2014/0172563 A1* | 6/2014 | Amit | G06Q 50/01 705/14.54 |
| 2014/0280460 A1* | 9/2014 | Nemer | G06F 17/3053 709/202 |
| 2014/0337132 A1* | 11/2014 | Kilroy | G06Q 30/0251 705/14.54 |

(Continued)

OTHER PUBLICATIONS

Susan Waldes, Gmail Sponsored Promotions: Everything You Need to Know to Succeed At Direct Response With GSP, Part 1, Mar. 10, 2015, Marketing Land (Year: 2015).*

(Continued)

*Primary Examiner* — Naresh Vig
(74) *Attorney, Agent, or Firm* — Schwegman Lundberg & Woessner, P.A.

(57) ABSTRACT

A system, a machine-readable storage medium storing instructions, and a computer-implemented method are described herein to detect access of a predefined resource by a target account. Responsive to the detected access of the predefined resource, a sender account is determined for a persistent message to be received by the target account. The persistent message is sent from the sender account to the target account.

20 Claims, 8 Drawing Sheets

(56) References Cited

U.S. PATENT DOCUMENTS

2014/0365317 A1* 12/2014 Goel .................. G06Q 30/0273
705/14.71

OTHER PUBLICATIONS

Susan Waldes, Gmail Sponsored Promotions: Everything You Need to Know to Succeed At Direct Response With GSP, Part 2, Mar. 30, 2015, Marketing Land (Year: 2015).*
Sankar Venkatrannan, InMail Policy Change to Increase Response Rates, Jul. 10, 2014, LinkedIn (Year: 2014).*
Amar Sheth, Reduce Cost-Per-Lead and Increase ROI—Linkedin InMail, Jul. 1, 2012, SalesForLife (Year: 2012).*
Russell Glass, Mar. 10, 2015, LlinkedIN to Relaunch Sponsored InMail, Now with 100% Deliveralibility, LinkedIn (Year: 2015).*
Charles Gaudet, 4 Best Practices for Generating More Leads on LinkedIn, Sep. 25, 2014, Forbes (Year: 2014).*
Rutledge, Understanding InMail, Introductions, and LinkedIn Messages, May 4, 2012, www.informit.com (Year: 2012).*
LinkedIn Sponsored inMail, 2013, LinkdeIn Corporation (Year: 2013).*
The Gooru, captured images of YouTube video presentation "How to Change your Sender Name in Gmail", Jun. 13, 2013, YouTube.com (Year: 2013).*
How to change the display sender name for your emails in Outlook, Sep. 19, 2014, ExtendOffice.com (Year: 2014).*

* cited by examiner

AUCTIONING SPONSORED MAIL BASED ON MEMBER ACTIVITY

CROSS-REFERENCE TO RELATED APPLICATIONS

This application claims the benefit of priority to U.S. Provisional patent application entitled "Auctioning Sponsored Mail Based Member Activity," Ser. No. 62/199,198, filed Jul. 30, 2015, which is hereby incorporated herein by reference in its entirety.

TECHNICAL FIELD

The present disclosure generally relates to data processing systems. More specifically, the present disclosure relates to methods, systems and computer program products for sending messages.

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCRIPTION

Figure 1:
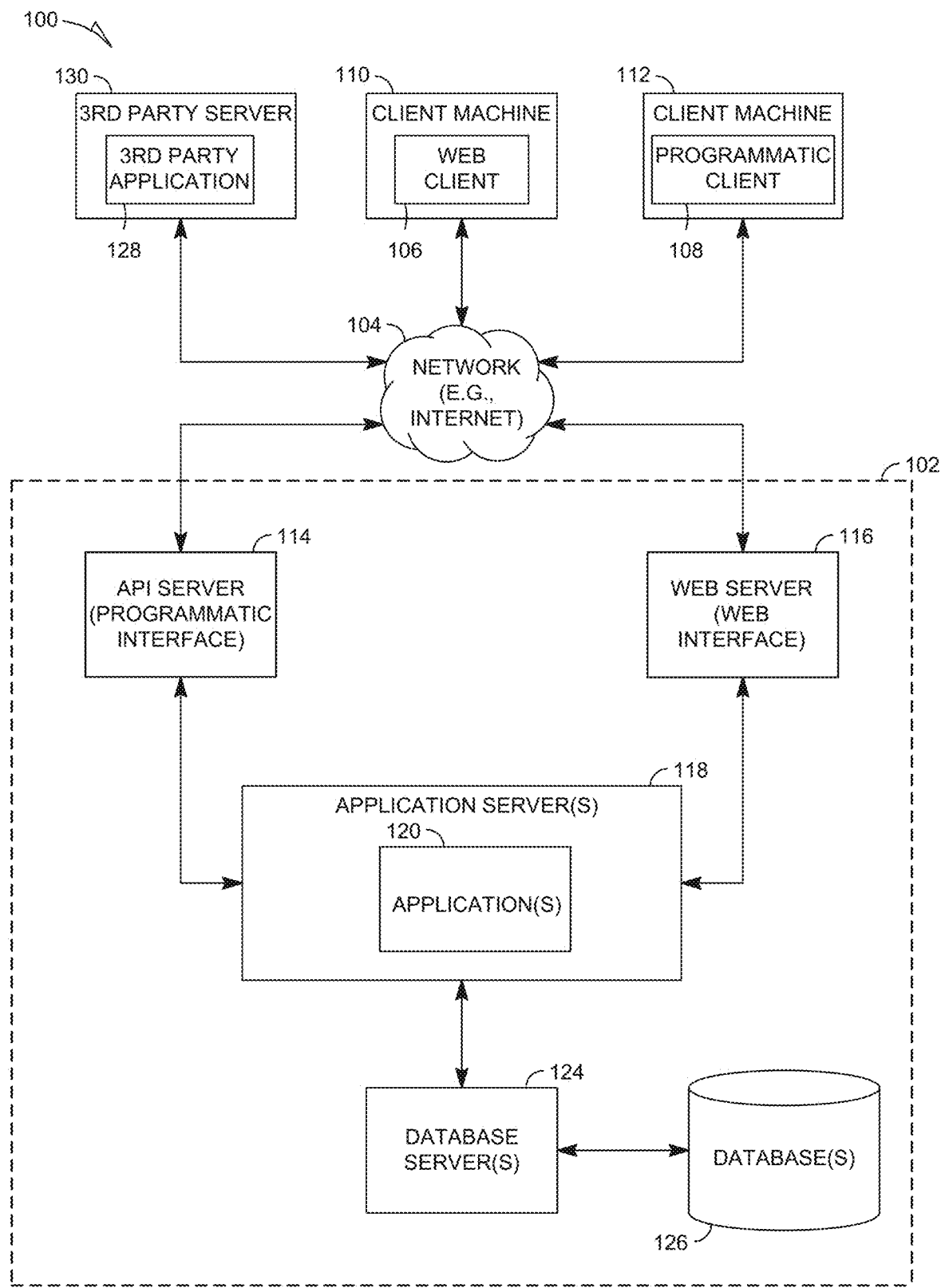
FIG. 1 is a block diagram illustrating a client-server system, in accordance with an example embodiment.

The present disclosure describes methods and systems for sending a sponsored persistent message within an online social networking service. In some embodiments, the online social networking service can be a professional social network. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

In various embodiments, a Sponsored Mail Auction Engine (hereinafter "S.M.A. Engine") is part of a professional social network. The S.M.A. Engine allows a $3^{rd}$ party sender account to place auction bids for sending messages from the $3^{rd}$ party sender account to accounts of one or more message recipients. The actual identity of each message recipient is not known when the auction bid is placed. Rather, the $3^{rd}$ party sender account selects various desired profile attributes of an ideal (or preferred type of) message recipient. Any member of the professional social network with the various desired profile attributes thereby can qualify as a potential recipient of the message from the $3^{rd}$ party sender account.

The S.M.A. Engine receives content from the $3^{rd}$ party sender account to be included in a persistent message. In some embodiments, the content can be advertising content to be included in the body of a persistent email message. It is understood that the S.M.A. Engine also receives the content from the $3^{rd}$ party sender account before determining the actual identity of a message recipient.

When a first member (or "target account") of the professional social network logs onto the professional social network, the S.M.A. Engine determines whether there is a match between the first member's profile attributes and the various desired profile attributes as selected by the $3^{rd}$ party sender account. If there is such a match, the S.M.A. Engine sends a message from the $3^{rd}$ party sender account to the first member's account on the professional social network. However, if the first member's profile attributes matches with respective desired profile attributes selected by a plurality of different $3^{rd}$ party sender accounts, the S.M.A. Engine determines that the first member's account receives a message from a particular $3^{rd}$ party sender account who placed the highest auction bid.

A system, a machine-readable storage medium storing instructions, and a computer-implemented method are described herein to detect access of a predefined resource by a target account. Responsive to the detected access of the predefined resource, a sender account is determined for a persistent message to be received by the target account. The persistent message is sent from the sender account to the target account. The persistent message includes content selected by the sender prior to the detected access of the predefined resource by the target account.

Turning now to FIG. 1, FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102. In some embodiments, the networked system 102 may comprise functional components of a professional social network.

Figure 2:
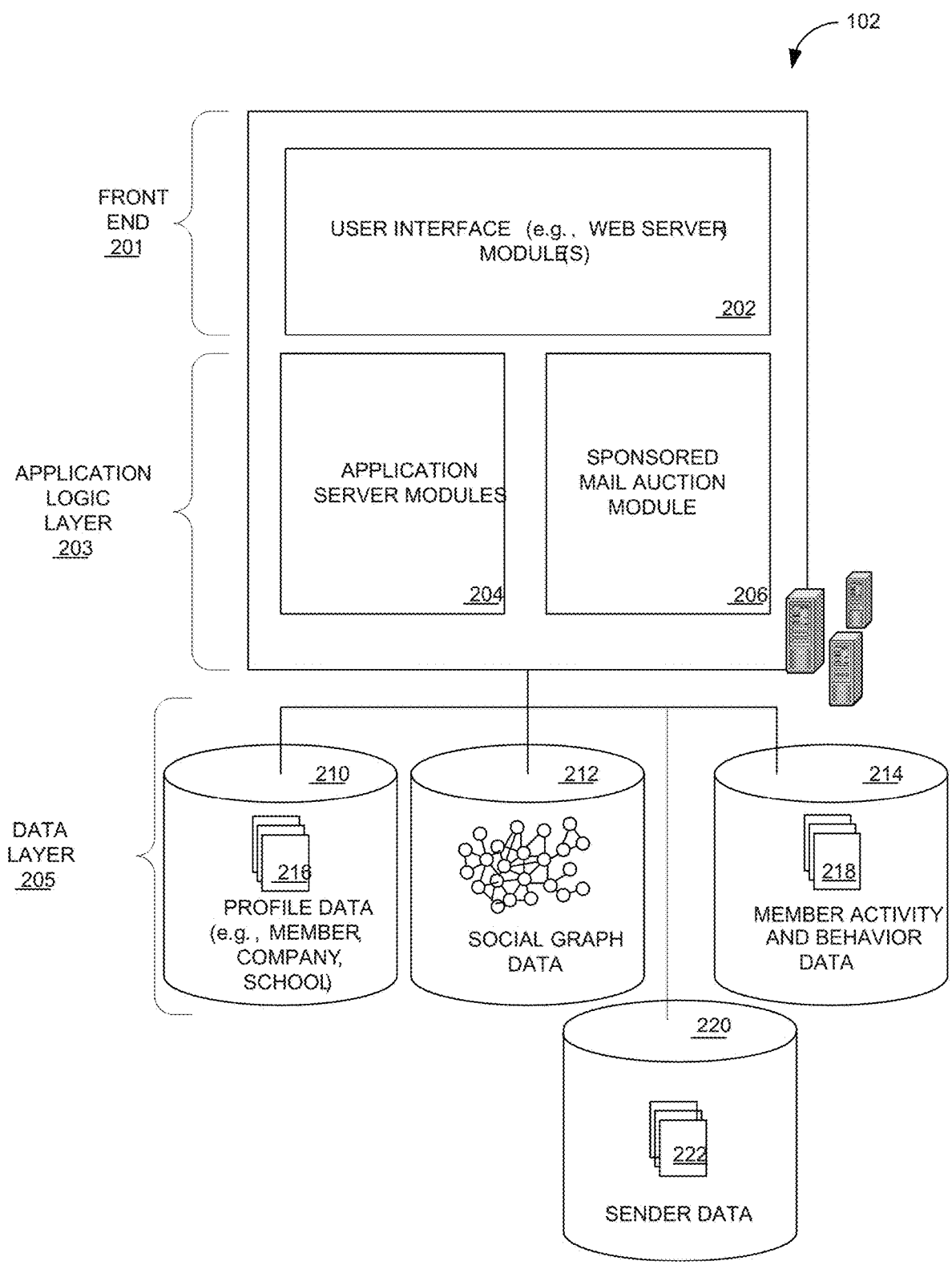
FIG. 2 is a block diagram showing functional components of a professional social network within a networked system, in accordance with an example embodiment.

FIG. 2 is a block diagram showing functional components of a professional social network within the networked system 102, in accordance with an example embodiment.

As shown in FIG. 2, the professional social network may be based on a three-tiered architecture, consisting of a front-end layer 201, an application logic layer 203, and a data layer 205. In some embodiments, the modules, systems, and/or engines shown in FIG. 2 represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, one skilled in the art will readily recognize that various additional functional modules and engines may be used with a professional social network, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although a professional social network is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front-end layer 201 comprises a user interface module (e.g., a web server) 202, which receives requests and inputs from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database 210 for storing profile data 216, including both member profile attribute data as well as profile attribute data for various organizations. Consistent with some embodiments, when a person initially registers to become a member of the professional social network, the person will be prompted to provide some profile attribute data such as, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network the representative may be prompted to provide certain information about the organization. This information may be stored, for example, in the database 210, or another database (not shown). With some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or a seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

Once registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

As members interact with the various applications, services and content made available via the professional social network, the members' behaviour (e.g., content viewed, links or member-interest buttons selected, etc.) may be monitored and information 218 concerning the member's activities and behaviour may be stored, for example, as indicated in FIG. 2, by the database 214. This information 218 may be used to classify the member as being in various categories and may be further considered as an attribute of the member. For example, if the member performs frequent searches of job listings, thereby exhibiting behaviour indicating that the member is a likely job seeker, this information 218 can be used to classify the member as being a job seeker. This classification can then be used as a member profile attribute for purposes of enabling others to target the member for receiving messages, status updates and/or a list of ranked premium and free job postings.

The data layer 205 further includes a sender repository 220 which includes message content, matching criteria and an auction bid received from a plurality of senders, such as members of the professional social network who wish to send persistent message targeted to a specific type of member.

In some embodiments, the professional social network provides an application programming interface (API) module via which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. In particular, some third-party applications may reside and execute on one or more mobile devices (e.g., a smartphone, or tablet computing devices) having a mobile operating system.

The data in the data layer 205 may be accessed, used, and adjusted by the S.M.A. Engine 206 as will be described in more detail below in conjunction with FIGS. 3-6. Although the S.M.A. Engine 206 is referred to herein as being used in the context of a professional social network, it is contemplated that it may also be employed in the context of any website or online services, including, but not limited to, content sharing sites (e.g., photo- or video-sharing sites) and any other online services that allow users to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure.

Figure 3:
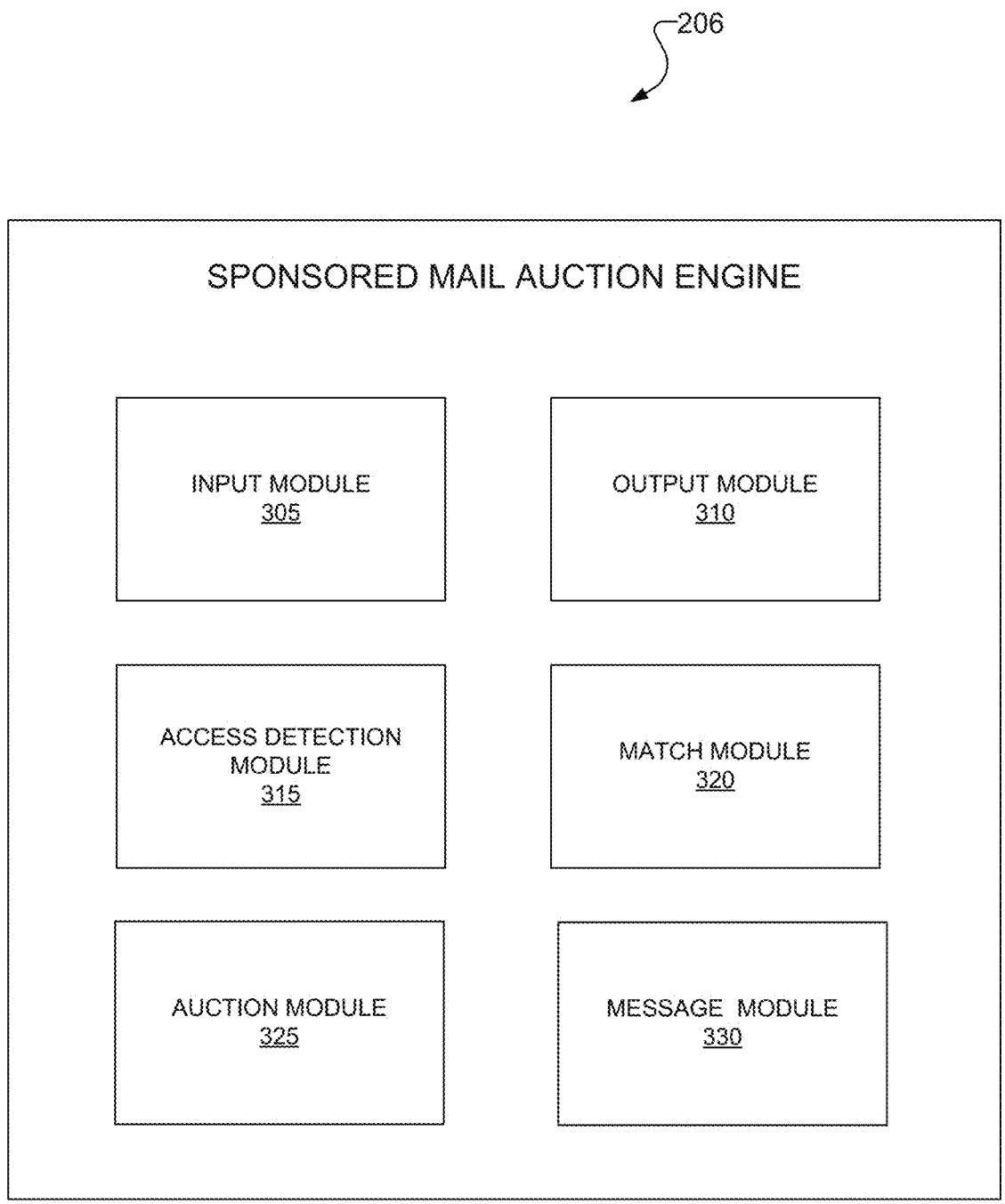
FIG. 3 is a block diagram showing example components of a Sponsored Mail Auction Engine, according to some embodiments.

FIG. 3 is a block diagram showing example components of a Sponsored Mail Auction Engine 206, according to some embodiments.

The input module 305 is a hardware-implemented module that controls, manages and stores information related to any inputs from one or more components of system 102 as illustrated in FIG. 1 and FIG. 2. In various embodiments, the inputs include one or more desired target attributes pre-selected by a respective sender account. An input also includes an auction bid representative of a price a sender account is willing to pay for triggering transmission of a persistent message from the sender account to a target account. An input also includes content received from a sender account to be includes as the content of a persistent message. Such content of the persistent message is received from the sender account prior to detecting access of a predefined resource by a target account.

The output module 310 is a hardware-implemented module that controls, manages and stores information related to which sends any outputs to one or more components of system 100 of FIG. 1 (e.g., one or more client devices 110, 112, third party server 130, etc.). In some embodiments, the output is a persistent message sent from a sender account to a target account. The output also includes a notification displayed at a location in the professional social network which indicates that the target account has received the persistent message.

The access detection module 315 is a hardware implemented module which manages, controls, stores, and accesses information related to detecting one or more target accounts currently accessing a predefined resource. In some embodiments, the predefined resource comprises a homepage, feed or messaging inbox within the professional social network.

The match module 320 is a hardware-implemented module which manages, controls, stores, and accesses information related to determining whether a particular target account qualifies as a potential recipient of a persistent message from a sender account. Responsive to the access of the predefined resource by the target account, the match module 320 determines whether a target account satisfies a frequency capping time range policy. In addition, the match module 320, determines whether any of profile attributes of the target account match with one or more desired target attributes pre-selected by a respective sender account(s).

The auction module 325 is a hardware-implemented module which manages, controls, stores, and accesses information related to executing an auction responsive to the access of the predefine resource by a target account. Based on determining that a target account qualifies for receipt of a persistent message and further determining that the target account has one or more attributes that match with desired target attributes pre-selected by a plurality of different sender accounts, the auction module 325 determines which of the different sender accounts has placed a highest auction bid for purchasing the opportunity to be indicated as a sender of a persistent message to the target account.

The message module 330 is a hardware-implemented module which manages, controls, stores, and accesses information related to sending a message from a sender account to a target account. The message module 330 generates a persistent message addressed from the sender account, which includes content received from the sender account.

Figure 4:
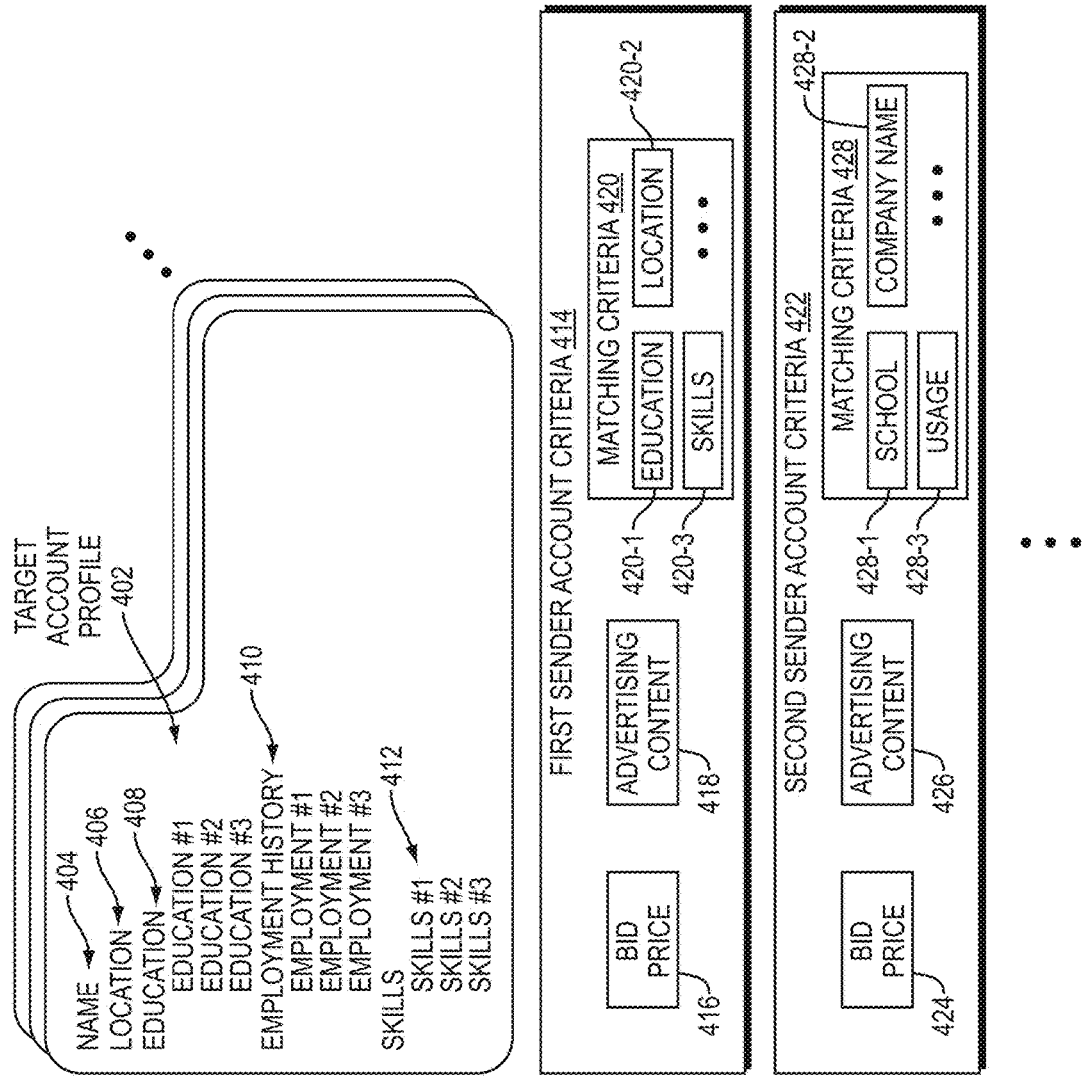
FIG. 4 is a block diagram showing an example target account profile and a plurality of criterion received from a plurality of sender accounts, according to some embodiments.

FIG. 4 is a block diagram showing an example target account profile and a plurality of criterion received from a plurality of sender accounts, according to some embodiments.

The S.M.A. Engine 206 in the professional social network has access to a plurality of target account profiles. A target account profile 402 includes a plurality of attributes 404, 406, 408, 410, 412 . . . . The target account profile 402 includes a name attribute 404 and a current location attribute 406. The target account profile 402 includes an education attribute(s) 408 which provides at least one of a name(s) of an educational institution, education institution location(s), years of attendance and a type(s) of degree earned. The target account profile 402 includes an employment attribute(s) 410 which provides at least one of a name(s) of current/former employer, current/former employer location(s), years of employment, job title(s), and job description(s). The target account profile 402 includes a skills attribute(s) 410 which includes a list of at least one description of a professional skill.

The S.M.A. Engine 206 in the professional social network receives criterion 414, 422 from a first sender account and a second sender account, respectively. It is understood that criterion can be received from multiple sender accounts. First sender account criteria 414 includes a bid price 416, advertising content 418 and matching criteria 420. When received, the matching criteria 420 indicates desired attributes in a target account that has yet to be identified. Desired target attributes in criteria 420 are listed as a type of education 420-1, a particular current location 420-2, and a particular type of skill(s) 420-3. Second sender account criteria 422 includes a bid price 424, advertising content 426 and matching criteria 428. The matching criteria 428 indicates desired attributes in a target account. Desired target attributes in criteria 428 are listed as a specific education institution 428-1, a specific employer (current or former) 428-2, and a particular type of frequency usage metric 428-3, which indicates how often a desired target account performs a type(s) of activity in the professional social network. It is understood that a desired target attribute in criterion 420, 428 can also be a keyword(s).

It is understood that matching criterion 414, 422 can include any type of attributes, such as type(s) of education, type(s) of location, type(s) of skills, type(s) of connections, type(s) of endorsements, type(s) of keywords on a profile, type(s) of browsing history, type(s) of browsing activity, profile completeness, amount of group memberships, etc.

Figure 5A:
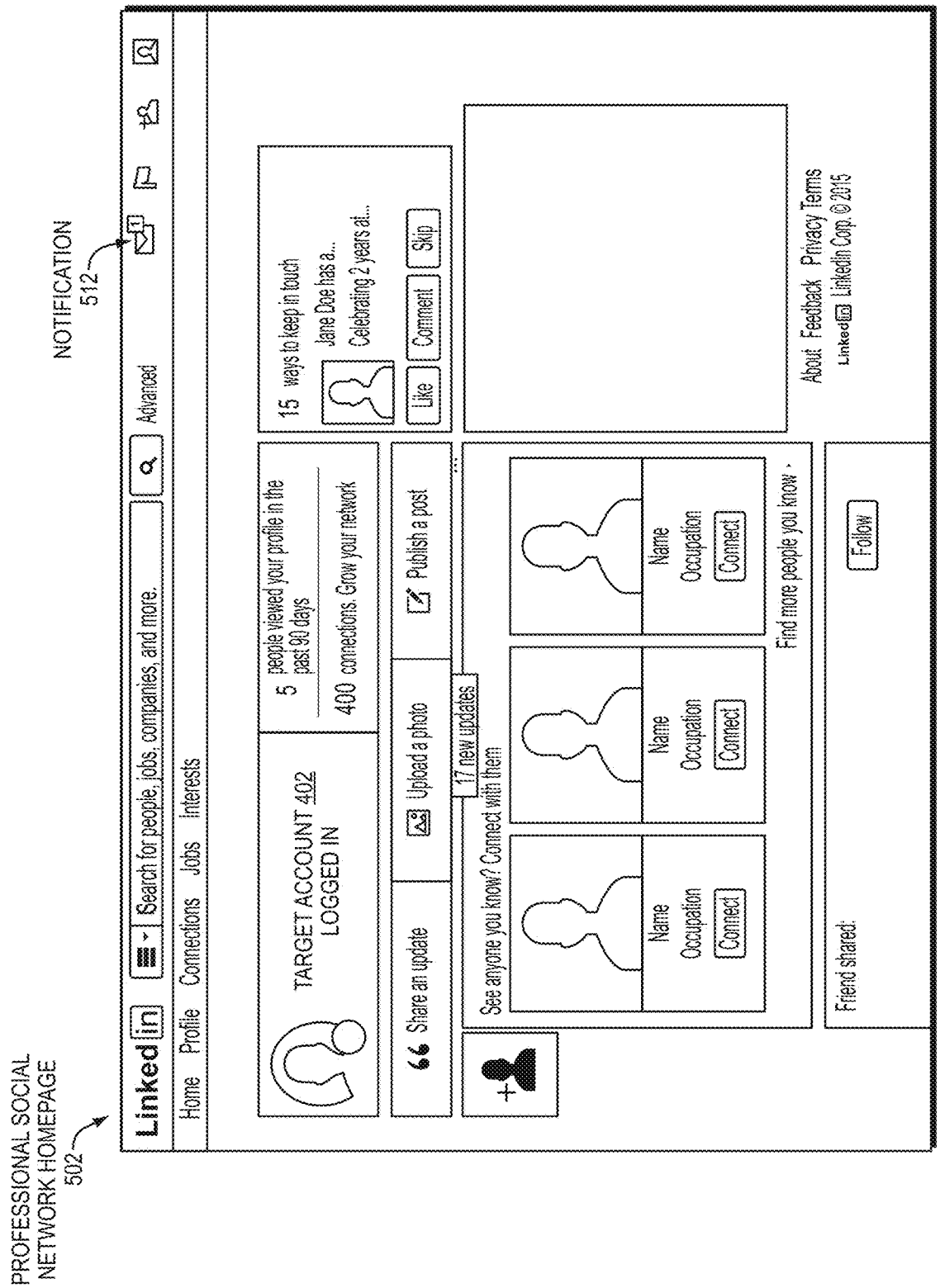
FIG. 5A is a block diagram showing an example of a professional social network homepage and FIG. 5B, is a block diagram showing an example messaging inbox view, according to some embodiments.
Figure 5B:
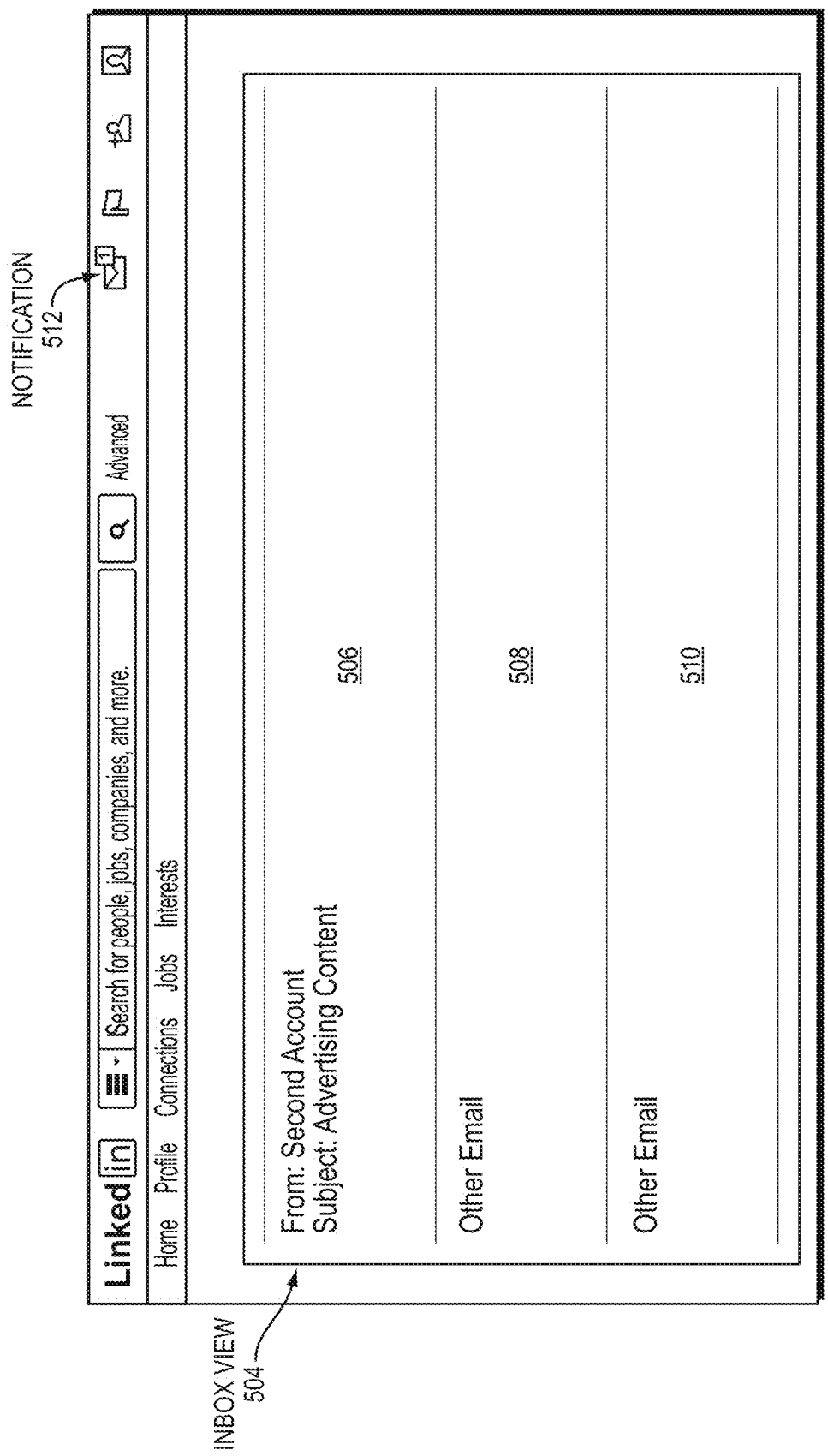

FIG. 5A is a block diagram showing an example of a professional social network homepage and FIG. 5B, is a block diagram showing an example messaging inbox view, according to some embodiments.

The S.M.A. Engine 206 detects that target account which corresponds with the target account profile 402 logs onto the professional social network homepage 502.

If the S.M.A. Engine 206 determines that the target account does not satisfy a frequency capping time range policy by determining the target account has not already received a maximum amount of persistent messages from one or more various sender accounts during a particular time range, the S.M.A. Engine 206 qualifies the target account to receive a persistent message. A persistent message is sent from, for example, the second sender account to the target account based on the second sender account having a highest bid 424 (e.g., in comparison to bid price 415 from the first sender account) and a match between matching criteria 428 and target account attributes 408, 410 and target account usage statistics.

The S.M.A. Engine 206 displays a notification 512 indicative of a persistent message 506 sent from the second sender account. Based on receiving a selection of the notification 512, the S.M.A. Engine 206 provides an inbox view 504 through which the persistent message 506 can be accessed. The persistent message 506 includes content based on advertising content 426 previously received from the second sender account before the target account logged onto the homepage 502. The inbox view also includes a plurality of previously received persistent messages 508, 510 from various different accounts.

Figure 6:
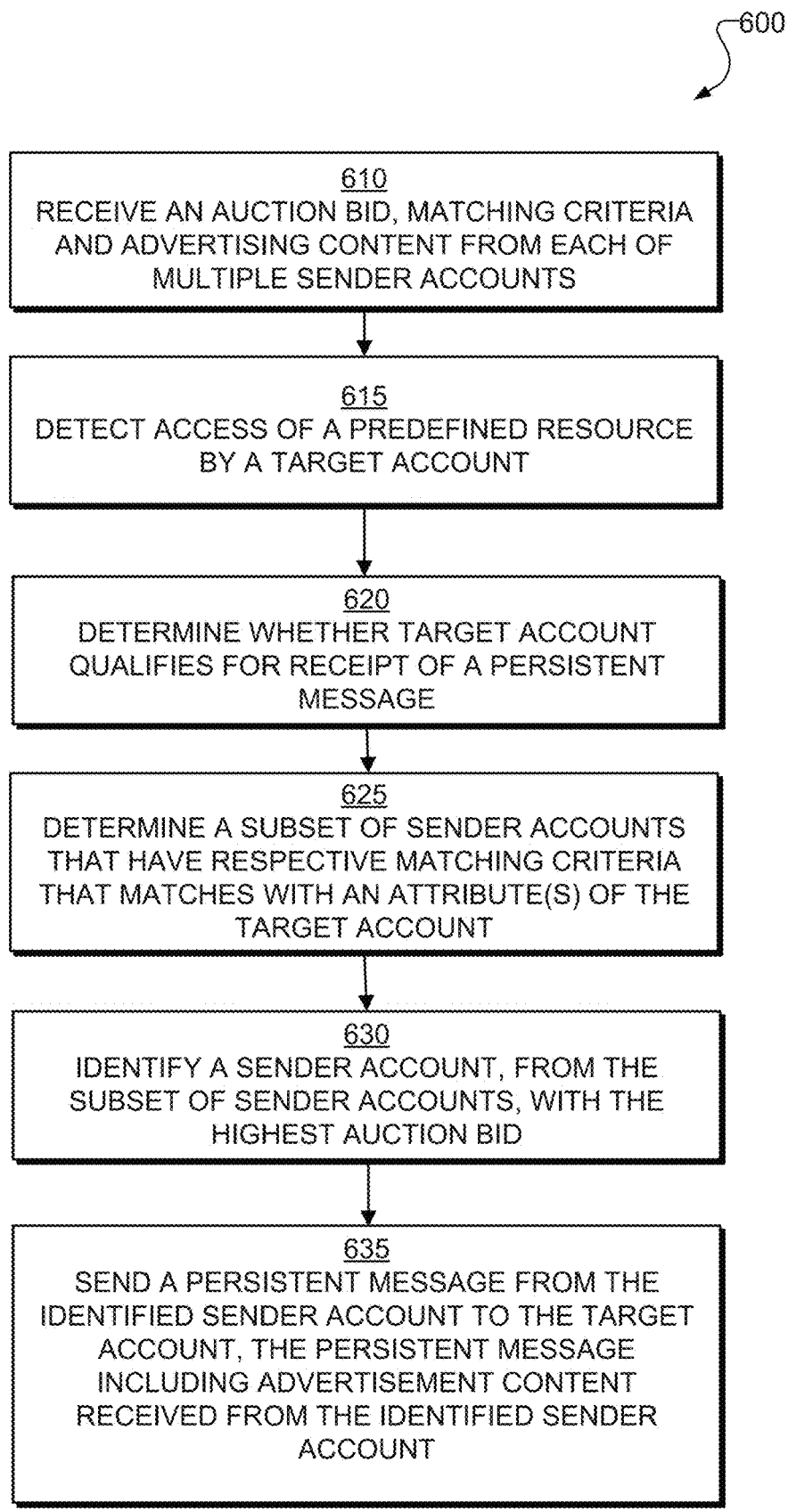
FIG. 6 is a flowchart illustrating a method of sending a persistent message from a sender account to a target account, according to embodiments described herein.

FIG. 6 is a flowchart illustrating a method 600 of sending a persistent message from a sender account to a target account, according to embodiments described herein.

At operation 610, the S.M.A. Engine 206 receives, from multiple sender accounts, an auction bid 416, 424, matching criteria 420, 428 and advertising content 418, 426.

The SME Engine 206 receives criterion 414, 422 from a first sender account and a second sender account, respectively. It is understood that a sender account can be a $3^{rd}$ party account (such as a member account) on the professional social network of a specific person, a specific group, a specific institution or a specific company. Each criterion 414, 422 comprises a model of a type of desired message recipient as defined by the first sender account and a second sender account prior to an identity of an actual message recipient being determined.

Each criterion 414, 422 includes an auction bid 416, 424 from each sender account. It is understood that the S.M.A. Engine 206 receives a respective auction bid from each of a plurality of different sender accounts. The auction bid represents an amount a respective sender account is willing to pay to have the S.M.A. Engine 206 send a persistent message from the sender account.

At operation 615, the S.M.A. Engine 206 detects access of a predefined resource by a target account 402. For example, the S.M.A. Engine 206 detects that a target account 402 has logged onto the professional social network. In some embodiments, a predefined resource is a main homepage 502 of the professional social network.

At operation 620, the S.M.A. Engine 206 determines whether the target account 402 qualifies for a receipt of a persistent message.

Responsive to the target account 402 logging onto the homepage 502, the S.M.A. Engine 206 determines whether the target account 402 qualifies for receipt of a persistent message from any sender account. The S.M.A. Engine 206 determines whether the target account 402 has already received a previous persistent message (from the sender account or a different sender account) according to a frequency capping time range policy.

For example, the frequency capping time range policy defines that any target account cannot currently receive a persistent message from any sender account if that target account has already received a previous persistent message 60 days prior to the target account's most recent log in onto the professional social network. In another example, a frequency capping time range policy defines that any target account cannot currently receive a persistent message from any sender account if that target account has already received two previous persistent messages 45 days prior to the target account's most recent log in onto the professional social network. It is understood that the frequency capping time range policy can be based on any amount of previous persistent messages and any time range.

If the S.M.A. Engine 206 determines that the target account 402 satisfies the frequency capping time range policy, that is, that the target account 402 has already received the maximum amount of previous persistent messages from one or more various sender accounts during a particular time range measured with respect to a current access of the homepage 502, the S.M.A. Engine 206 disqualifies the target account 402 from further receiving an additional persistent message.

However, if the S.M.A. Engine 206 determines that the target account 402 does not satisfy the frequency capping time range policy, that is, the target account 402 has not already received the maximum amount of previous persistent messages from one or more various sender accounts during a particular time range measured with respect to a current access of the homepage 502, the S.M.A. Engine 206 qualifies the target account 402 to receive a persistent message in relation to the target account's 402 current access of the homepage 502.

At operation 625, the S.M.A. Engine 206 determines a subset of sender accounts that have respective matching criteria 420, 428 that matches with an attribute(s) 404, 406, 408, 410, 412 of the target account 402.

Upon determining the target account 402 does not satisfy the frequency capping time range policy and is therefore qualified to receive a persistent message, S.M.A. Engine 206 determines whether there is any match between one or more profile attributes 404, 406, 408, 410, 412 of the target account 402 and desired profile attributes described in matching criterion 420, 428 that have been pre-selected by one or more different sender accounts.

For example, the S.M.A. Engine 206 determines that a first set of profile attributes 408, 406, 412 of the target account 402 matches with a first set of desired profile attributes 420-1, 420-2, 420-3 pre-selected by a first sender account. The S.M.A. Engine 206 also determines that a second set of profile attributes 408, 410 and usage statistics of the target account 402 matches with a second set of desired profile attributes 428-1, 428-2, 428-3 pre-selected by a second sender account.

At operation 630, the S.M.A. Engine 206 identifies a sender account, from the subset of sender accounts, with the highest auction bid.

Based on both the first and second sender accounts having respective matching criterion 420, 428 that matches with attributes of the target account 402, the S.M.A. Engine 206 compares the bid prices 416, 424 received from the first and second sender accounts. The sender account with the highest auction bid is selected by the S.M.A. Engine 206 as a source of a persistent message.

At operation 635, the S.M.A. Engine 206 sends a persistent message 502 from the identified sender account to the target account 402. In some embodiments, the persistent message 506 includes advertising content 426 received from the identified sender account prior to detecting access of the predefined resource by the target account 402.

For example, based on determining the auction bid price 424 of the second sender account is higher than the auction bid price 416 of the first sender account, the S.M.A. Engine 206 sends the persistent message 506 from the second sender account to the target account 402. The persistent message 506 is accessible by the target account 402 by an inbox view 504 provided by the professional social network.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
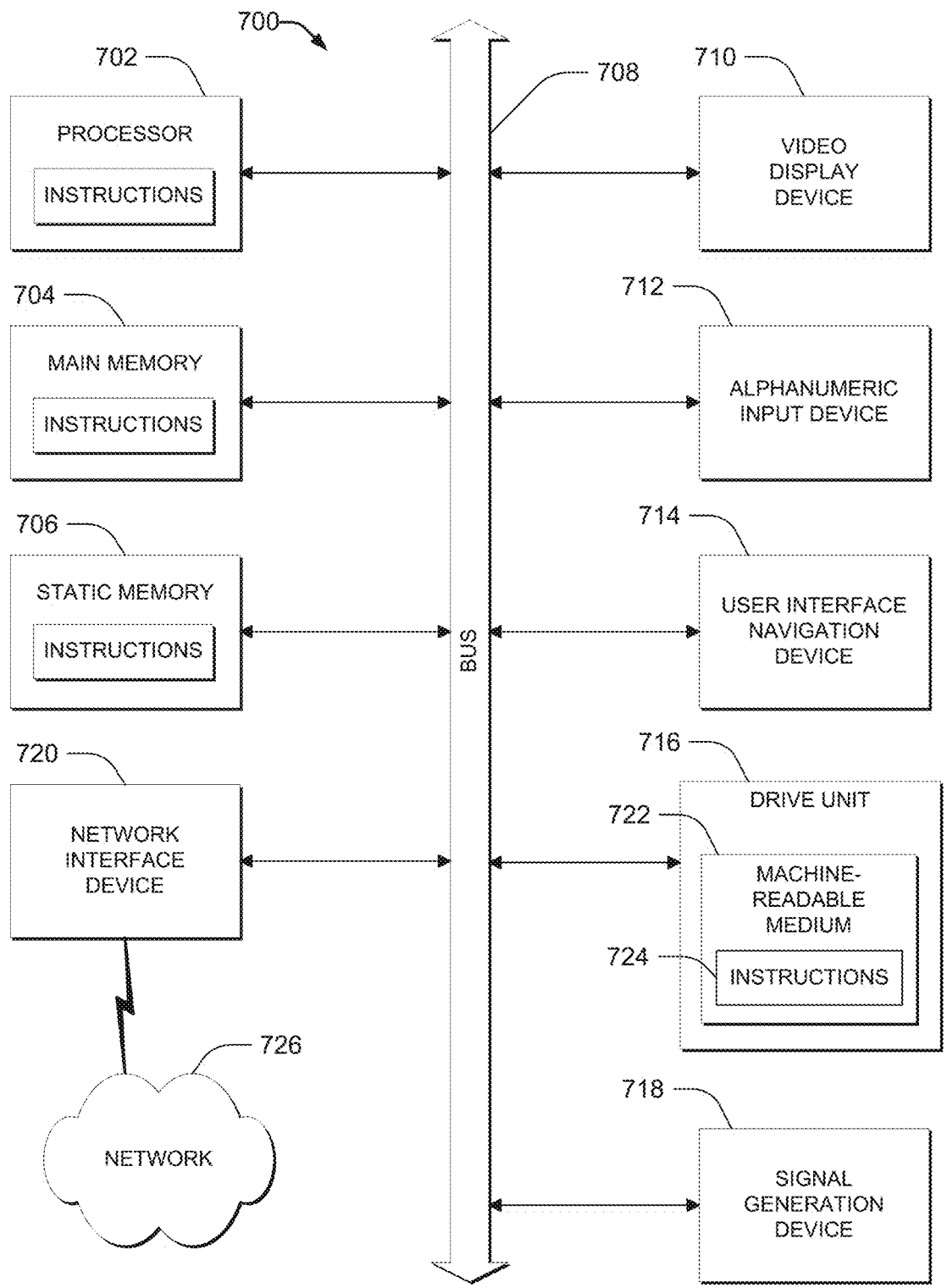
FIG. 7 is a block diagram of an example computer system on which methodologies described herein may be executed, in accordance with an example embodiment.

FIG. 7 is a block diagram of a machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 702 (e.g., a central processing unit (CPU), a graphics processing unit (GPU) or both), a main memory 704, and a static memory 706, which communicate with each other via a bus 708. Computer system 700 may further include a video display device 710 (e.g., a liquid crystal display (LCD) or a cathode ray tube (CRT)). Computer system 700 also includes an alphanumeric input device 712 (e.g., a keyboard), a user interface (UI) navigation device 714 (e.g., a mouse or touch sensitive display), a disk drive unit 716, a signal generation device 718 (e.g., a speaker) and a network interface device 720.

Disk drive unit 716 includes a machine-readable medium 722 on which is stored one or more sets of instructions and data structures (e.g., software) 724 embodying or utilized by any one or more of the methodologies or functions described herein. Instructions 724 may also reside, completely or at least partially, within main memory 704, within static memory 706, and/or within processor 702 during execution thereof by computer system 700, main memory 704 and processor 702 also constituting machine-readable media.

While machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 724 may further be transmitted or received over a communications network 726 using a transmission medium. Instructions 724 may be transmitted using network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   detecting, by an access detection module of an application server, access of a predefined resource by a target account;
   responsive to the detected access of the predefined resource, causing display of the predefined resource in a graphical user interface and determining, by a match module of the application server, a sender account from among a plurality of potential sender accounts for a persistent message to be received by the target account; and
   sending, by a message module of the application server, the persistent message from the sender account to the target account, where the persistent message is an email addressed from the sender account such that a reply to the email is sent to the sender account and not to the application server, wherein the email contains a subject line and a body.

2. The computer-implemented method as in claim 1, wherein detecting access of a predefined resource by a target account comprises:
   determining whether a maximum amount of previous persistent messages were already sent to the target account within a frequency capping time range measured up until the detected access of the predefined resource;
   responsive to determining that the target account has received the maximum amount of previous persistent messages during the frequency capping time range, disqualifying the target account for receipt of the persistent message; and
   responsive to determining that the target account has not received the maximum amount of previous persistent messages during the frequency capping time range, qualifying the target account for receipt of the persistent message.

3. The computer-implemented method as in claim 1, wherein determining a sender account for a persistent message to be received by the target account comprises:
   determining at least one attribute of the target account matches at least one desired target attribute pre-selected by the sender account; and
   selecting the sender account based at least on a match between the at least one attribute of the target account and the at least one desired target attribute.

4. The computer-implemented method as in claim 3, wherein determining at least one attribute of the target account matches at least one desired target attribute pre-selected by the sender account comprises:

determining at least one profile attribute of a target member of an online social networking service matches at least one desired profile attribute pre-selected by a sender member of the professional social network.

5. The computer-implemented method as in claim 1, wherein determining a sender account for a persistent message to be received by the target account comprises:

determining a first attribute of the target account matches a first desired target attribute pre-selected by a first sender account;

determining a second attribute of the target account matches a second desired target attribute pre-selected by a second sender account;

determining a first auction bid received from the first sender account has a higher price than a second auction bid received from the second sender account, the first and second auction bids received prior to the detected access of the predefined resource by the target account; and selecting the first sender account based at least on the higher price of the first auction bid and a match between the first attribute of the target account and the first desired target attribute.

6. The computer-implemented method as in claim 1, wherein detecting access of a predefined resource by a target account comprises:

detecting access of a predetermined location within an online social networking service by a target member of the online social networking service; and wherein sending the persistent message from the sender account to the target account comprises:

triggering display of a notification at the predetermined location, the notification indicating to the target member that the persistent message is available for access in the online social networking service by the target member.

7. The computer-implemented method as in claim 1, wherein the persistent message includes content received from the sender account prior to the detected access of the predefined resource by the target account.

8. A non-transitory computer-readable medium storing executable instructions thereon, which, when executed by a processor, cause the processor to perform operations including:

detecting, by an access detection module of an application server, access of a predefined resource by a target account;

responsive to the detected access of the predefined resource, causing display of the predefined resource in a graphical user interface and determining, by a match module of the application server, a sender account from among a plurality of potential sender accounts for a persistent message to be received by the target account; and sending, by a message module of the application server, the persistent message from the sender account to the target account, where the persistent message is an email addressed from the sender account such that a reply to the email is sent to the sender account and not to the application server, wherein the email contains a subject line and a body.

9. The non-transitory computer-readable medium as in claim 8, wherein detecting access of a predefined resource by a target account comprises:

determining whether a maximum amount of previous persistent messages were already sent to the target account within a frequency capping time range measured up until the detected access of the predefined resource;

responsive to determining the target account has received the maximum amount of previous persistent messages during the frequency capping time range, disqualifying the target account for receipt of the persistent message; and responsive to determining the target account has not received the maximum amount of previous persistent messages during the frequency capping time range, qualifying the target account for receipt of the persistent message.

10. The non-transitory computer-readable medium as in claim 8, wherein determining a sender account for a persistent message to be received by the target account comprises:

determining at least one attribute of the target account matches at least one desired target attribute pre-selected by the sender account; and selecting the sender account based at least on a match between the at least one attribute of the target account and the at least one desired target attribute.

11. The non-transitory computer-readable medium as in claim 10, wherein determining at least one attribute of the target account matches at least one desired target attribute pre-selected by the sender account comprises:

determining at least one profile attribute of a target member of an online social networking service at least one desired profile attribute pre-selected by a sender member of the online social networking service.

12. The non-transitory computer-readable medium as in claim 8, wherein determining a sender account for a persistent message to be received by the target account comprises:

determining a first attribute of the target account matches a first desired target attribute pre-selected by a first sender account;

determining a second attribute of the target account matches a second desired target attribute pre-selected by a second sender account;

determining a first auction bid received from the first sender account has a higher price than a second auction bid received from the second sender account, the first and second auction bids received prior to the detected access of the predefined resource by the target account; and selecting the first sender account based at least on the higher price of the first auction bid and a match between the first attribute of the target account and the first desired target attribute.

13. The non-transitory computer-readable medium as in claim 8, wherein detecting access of a predefined resource by a target account comprises:

detecting access of a predetermined location within an online social networking service by a target member of the online social networking service.

14. The non-transitory computer-readable medium as in claim 13, wherein sending the persistent message from the sender account to the target account comprises:

triggering display of a notification at the predetermined location, the notification indicating to the target member that the persistent message is available for access in the online social networking service by the target member.

15. A computer system comprising:

a processor;

a memory device holding an instruction set executable on the processor to cause the computer system to perform operations comprising:

detecting, by an access detection module of an application server, access of a predefined resource by a target account;

responsive to the detected access of the predefined resource, causing display of the predefined resource in a graphical user interface and determining, by a match module of the application server, a sender account from among a plurality of potential sender accounts for a persistent message to be received by the target account; and sending, by a message module of the application server, the persistent message from the sender account to the target account, where the persistent message is an email addressed from the sender account such that a reply to the email is sent to the sender account and not to the application server, wherein the email contains a subject line and a body.

16. The computer system as in claim 15, wherein detecting access of a predefined resource by a target account comprises:

determining whether a maximum amount of previous persistent messages were already sent to the target account within a frequency capping time range measured up until the detected access of the predefined resource;

if the target account has received the maximum amount of previous persistent messages during the frequency capping time range, disqualifying the target account for receipt of the persistent message; and if the target account has not received the maximum amount of previous persistent messages during the frequency capping time range, qualifying the target account for receipt of the persistent message.

17. The computer system as in claim 15, wherein determining a sender account for a persistent message to be received by the target account comprises:

determining at least one attribute of the target account matches at least one desired target attribute pre-selected by the sender account; and selecting the sender account based at least on a match between the at least one attribute of the target account and the at least one desired target attribute.

18. The computer system as in claim 17, wherein determining at least one attribute of the target account matches at least one desired target attribute pre-selected by the sender account comprises:

determining at least one profile attribute of a target member of an online social networking service matches at least one desired profile attribute pre-selected by a sender member of the online social networking service.

19. The computer system as in claim 15, wherein determining a sender account for a persistent message to be received by the target account comprises:

determining a first attribute of the target account matches a first desired target attribute pre-selected by a first sender account;

determining a second attribute of the target account matches a second desired target attribute pre-selected by a second sender account;

determining a first auction bid received from the first sender account has a higher price than a second auction bid received from the second sender account, the first and second auction bids received prior to the detected access of the predefined resource by the target account; and selecting the first sender account based at least on the higher price of the first auction bid and a match between the first attribute of the target account and the first desired target attribute.

20. The computer system as in claim 15, wherein detecting access of a predefined resource by a target account comprises:

detecting access of a predetermined location within an online social networking service network by a target member of the online social networking service; and wherein sending the persistent message from the sender account to the target account comprises:

triggering display of a notification at the predetermined location, the notification indicating to the target member that the persistent message is available for access in the online social networking service by the target member.

* * * * *